United States Patent Office 3,435,507
Patented Apr. 1, 1969

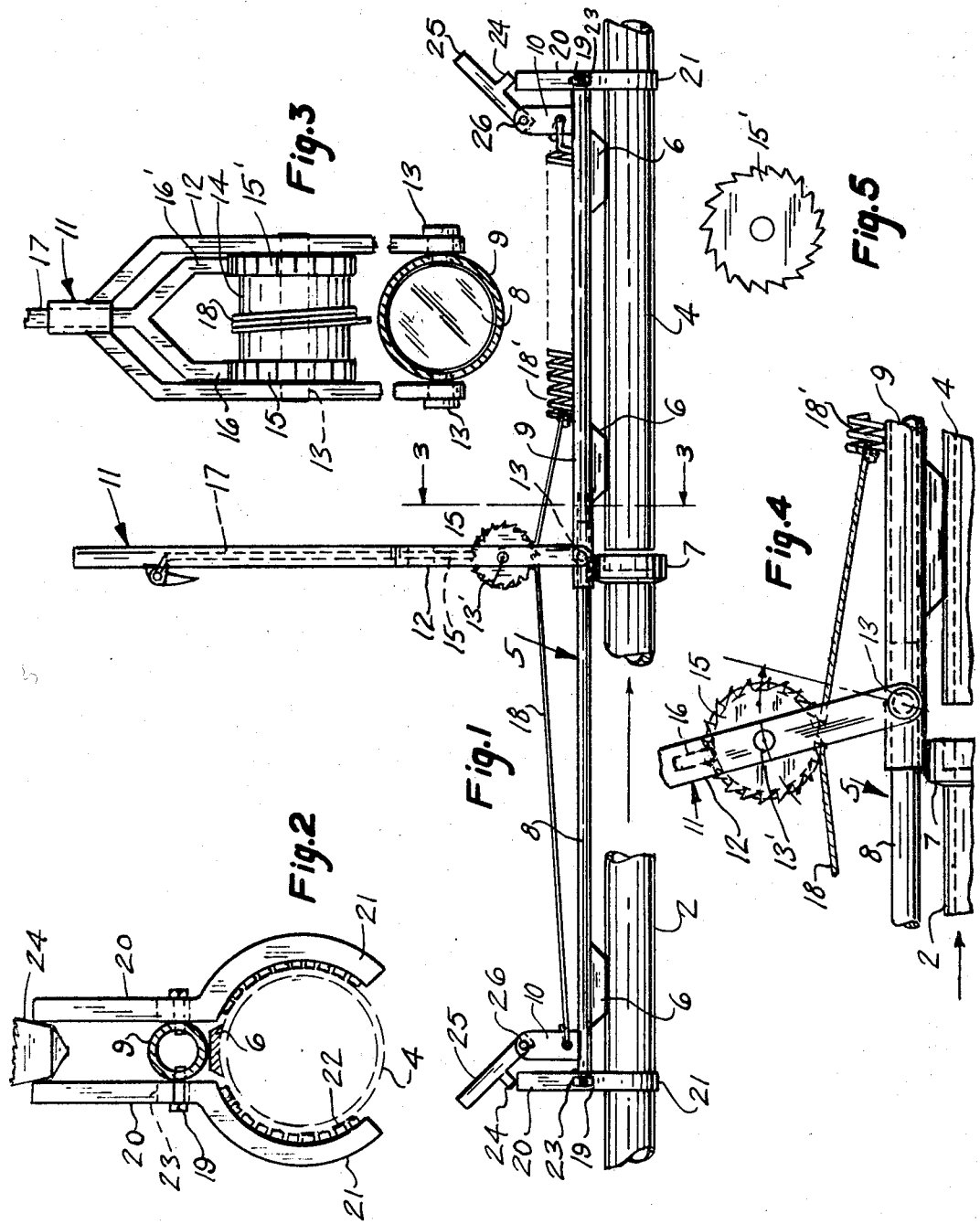
INVENTOR.
Charles F. Pronovost

3,435,507
WATER PIPE COUPLER
Charles F. Pronovost, 6429 195th Ave. E.,
Sumner, Wash. 98390
Filed Jan. 24, 1967, Ser. No. 611,374
Int. Cl. B23p 19/02
U.S. Cl. 29—237
5 Claims

ABSTRACT OF THE DISCLOSURE

Apparatus to align and pull pipe sections together is disclosed. A two part telescoping frame with a pipe gripping jaw on each end is provided. A lever with a ratchet held drum is mounted on one frame part. One end of a cable is secured to the second frame part and extends around the drum on the lever. A pull on the lever will pull the cable and urge the telecoping frame parts together. Reverse movement of the lever allows more cable to wind around the drum by spring action. The lever can be pulled again, if needed, to further telescope the frame parts together.

---

The present invention relates to the art of laying water pipe, more particularly underground water pipe in which aligned sections of the pipe are coupled together by the known and commonly used bell-and-spigot flexible connection.

Heretofore the laying of such pipe in a trench has required the labor of four or five men and to reduce to a minimum this excessive manpower by providing means whereby the coupling is performed by one person is the main object of this invention.

To accomplish the aforesaid objective necessitates the employment of a manually operable coupling apparatus and to provide a new and novel device for this purpose is another object of the invention.

Further objects of the invention have been accomplished in the construction of a device for the purpose just set forth above, which is of few parts, light in weight, easy to manipulate and which, while maintaining sections of pipe being coupled in axial alignment, draws them relatively together by the throw of a single operating lever.

Other objects and advantages of the invention will become apparent from a consideration of the following detailed description taken in connection with the accompanying drawings wherein a preferred embodiment of the invention is shown. However, it is to be understood that the invention is not limited to the details disclosed but includes all such variations and modifications as fall within the spirit and scope of the invention as set forth in this specification and particularly defined in the appended claims.

In the drawings:

FIGURE 1 is a view of the invention in side elevation with the clutch members in operative position and the operating lever seen in the vertical or median line of its throw;

FIGURE 2 is an end view of one of the clutch members of FIGURE 1;

FIGURE 3 is an enlarged sectional detail on line 3—3 of FIGURE 1 looking in the direction of the arrows, a fragmentary portion of the lever being broken away.

FIGURE 4 is an enlarged side view of the cable winding drum and associated parts with the operating lever in the angular position it assumes at the start of the pipe coupling movement; and FIGURE 5 is a face view of the ratchet wheel opposed to the ratchet wheel of FIGURE 4.

In the drawings like numerals of reference refer to similar parts throughout the several views.

Two like sections or lengths of water pipe 2 and 4 to be coupled by the commonly known bell-and-spigot connection are indicated at the left and right, respectively, of FIGURES 1 and 4, the two sections being in substantially axial alignment and supposedly resting on or in close proximity to the bottom of a trench not shown.

The frame portion of the coupling apparatus, and indicated in general by numeral 5, is supported upon the pipe sections 2 and 4 in parallel longitudinal relation thereto but at a distance therefrom by chocks 6 interposed between the pipe and the frame 5, thus permitting movement under the frame of the bell-mouth end 7 of pipe section 2. The frame 5 comprises two axially telescoping members 8 and 9 adjacent the outer end of each of which and integral therewith is an upstanding lug 10. Preferably, the member 8 is a solid rod and the member 9 tubular throughout its full extent.

A manually operable lever, in general indicated at 11, includes a bifurcated lower portion 12 fulcrummed at substantially the median point of frame 5 on studs 13 extending laterally from the tubular frame member 9. Revolubly mounted in the lever portion 12 to turn about an axis 13' is a drum 14 to which are fixed a pair of ratchet wheels 15 and 15'. These ratchet wheels cooperate with actuating pawls 16 and 16', respectively, to rotate the drum 14 in one direction or the other according to which pawl is in functional engagement with its respective ratchet wheel, the pawls being under control of an actuating rod 17 slidably mounted within the lever 11.

A cable 18 wound about the drum 14 has one end anchored to the lug 10 on the frame arm 8 and its other end connected to the forward end of a coiled tension spring 18', the other end of such spring being anchored to the similar lug 10 on the frame arm 9. The spring maintains the cable 18 taut at all times and for any and all angular positions of the lever 11.

The pipe gripping means comprises a pair of opposing jaw members mounted on removable studs 19 extending laterally from the outer end of each frame arm 8 and 9. Each such pair of jaw members includes spaced parallel upper arms 20 and outwardly curved lower portions 21, the latter having serrated pipe gripping surfaces 22. The arm portions 20 have slot openings 23 in which the studs 19 are mounted for both rotary and vertical sliding movement.

The jaw holding means carried by the frame arms 8 and 9 is for each pair of jaws, a wedge 24 protruding downwardly from a rocker arm 25 pivotally mounted at its inner end on a pin 26 in the respective one of the frame lugs 10, the wedges either dropping gravity or being forced between the spaced side arms 20 of the jaws.

In operation, pushing the lever forward to the position shown in FIGURE 4, the drum 14 rolls up a portion of the cable seen to the left in FIGURE 1. Then, by a backward throw of the lever, the cable 18, held taut by the spring 18', and with the ratchet wheel 15' engaged by its cooperating pawl 16', pulls the pipe sections 2 and 4 relatively toward each other and into bell-and spigot locking connection.

It may here be stated that while the jaws and ratchet mechanism are made of steel other parts of the apparatus may be made of aluminum thus reducing its weight. It is of strong and durable construction, of but few parts and practical in its operation. The jaws are removably mounted and in size may be from three to ten inches. And, as hereinabove stated the device rests upon the pipe sections to be connected and its operation requires the service of but one man.

What I claim is:

1. The combination, in a pipe coupling apparatus, of a frame portion comprising two arm members in telescopic engagement, one within the other and a lug adjacent the outer end of each of said arms, the said lugs being integral with their respective arm members and in upstanding relation thereto; a manuallly operable lever including a bifurcated lower portion fulcrumed on studs extending laterally from the other one of said telescoping arms at substantially the median point of the said frame, a drum revolubly mounted in said bifurcated portions of said lever, a pawl and ratchet wheel for rotating the said drum when said lever is thrown in one direction and a second pawl and ratchet wheel operating to rotate said drum on the throw of said lever in the opposite direction, a cable wound on said drum, one end of said cable being anchored to one and its other end, through the medium of a coiled tension spring being anchored to the other of the said frame lugs; pipe gripping means at opposite ends of the said frame member for drawing adjoining lengths of pipe relatively toward each other as the said cable is shortened by rotation of said drum and the operative throw of said lever, and means carried by said fame lugs for holding said gripping members in clamping engagement with their respective pipe sections.

2. The combination according to claim 1 wherein the innner one of the said frame arm members is a solid bar and the outer member is a tubular pipe.

3. The combination according to claim 1 characterized by the said cable being held taut at all times and for any angular position of the said lever.

4. The combination according to claim 1 wherein each of said pipe gripping means comprises a pair of opposing jaw members including spaced parallel upper portions and outwardly curved lower portions, the latter having serrated pipe gripping surfaces, axially aligned removable pins in said frame arms on which said upper jaw portions are mounted, such portions having vertical slots which permit both rotary and sliding movement of the said jaws, and said jaws holding means carried by the said frame members being wedges protruding from rocker arms having pivotal connection with the said upstanding frame lugs, the said wedges engaging between the said spaced upper portions of the said jaws.

5. A pipe coupling apparatus according to claim 1 and supported upon two relatively movable lengths of pipe adapted to be joined by bell-and-spigot connection, said apparatus including chocks interposed between the said pipe and the said frame arms of the apparatus to maintain said arms in parallel relation to and at a predetermined space above the pipe.

References Cited

UNITED STATES PATENTS

| | | | |
|---|---|---|---|
| 534,280 | 2/1895 | Parkhurst | 29—237 X |
| 3,137,063 | 6/1964 | Pennachi | 29—237 |

LESTER M. SWINGLE, *Primary Examiner.*

J. C. PETERS, *Assistant Examiner.*